United States Patent [19]

Swanson et al.

[11] Patent Number: 5,705,573

[45] Date of Patent: Jan. 6, 1998

[54] PROCESS FOR PREPARATION OF WATER BORNE CURING AGENTS

[75] Inventors: Douglas R. Swanson; Donald A. Tomalia, both of Midland, Mich.

[73] Assignee: Michigan Molecular Institute, Midland, Mich.

[21] Appl. No.: 708,677

[22] Filed: Sep. 5, 1996

[51] Int. Cl.$^6$ ................................................. C08F 8/00
[52] U.S. Cl. ................. 525/343; 525/330.5; 525/359.1; 525/359.3; 525/380
[58] Field of Search .................. 525/343, 359.1, 525/359.3, 380

[56] References Cited

U.S. PATENT DOCUMENTS

| | | | |
|---|---|---|---|
| 4,929,666 | 5/1990 | Schmidt et al. | 524/516 |
| 5,006,624 | 4/1991 | Schmidt et al. | 526/243 |
| 5,310,792 | 5/1994 | Inoue | 525/330.5 |
| 5,610,208 | 3/1997 | Dairoko et al. | 525/384 |

*Primary Examiner*—Bernard Lipman
*Attorney, Agent, or Firm*—Price, Heneveld, Cooper, DeWitt & Litton

[57] ABSTRACT

A novel process for preparing poly(2-isopropenyl-2-oxazoline or oxazine) and its methyl methacrylate copolymer, which are useful as water borne curing agents, particularly in the non-stick coating industry. The process converts commercially available poly(methyl methacrylate) into poly(2-isopropenyl-2-oxazoline or oxazine) polymers or copolymers with methyl methacrylate, while circumventing the use of the highly toxic monomer, 2-isopropenyl-2-oxazoline or oxazine. The process involves converting a poly(methacrylic ester) to the corresponding poly(β-hydroxy-N-ethyl or propyl methacrylamide) and activating the ring-forming β-hydroxy-N-ethyl or propyl methacrylamide moiety to form an oxazoline or oxazine ring.

43 Claims, No Drawings

PROCESS FOR PREPARATION OF WATER BORNE CURING AGENTS

CROSS REFERENCE TO RELATED APPLICATION

This application claims priority to provisional patent application Ser. No. 60/003,291, filed Sep. 6, 1995, and entitled PROCESS FOR PREPARATION OF WATER BORNE CURING AGENTS.

BACKGROUND OF THE INVENTION

Development of an environmentally acceptable water borne coating technology with non-stick properties normally associated with Teflon® has widespread commercial interest. A fluorocarbon coating formed by reacting a fluoroaliphatic vinyl/vinyl carboxylic acid copolymer (ammonium salt) and a copolymer of 2-isopropenyl-2-oxazoline (or oxazine)/methyl methacrylate appears to offer such promise. The two copolymers are mixed in a water medium and heated to volatilize the water and to release ammonia. The thermally induced conversion of ammonium cation to ammonia allows protonation of the oxazoline ring to form the oxazolininm cation which is ring opened by the associated carboxylate anion. Thus, a neutral covalently cross-linked system is produced with ammonia and water as the only byproducts.

U.S. Pat. Nos. 4,929,666 and 5,006,624 to Schmidt et al. teach the production of coatings according to this chemistry. In Schmidt et al., the polyfunctional oxazoline or oxazine is obtained by addition polymerization of the oxazoline or oxazine monomer.

Such coatings derived from aqueous systems can be applied to various surfaces and easily cured without the evolution of environmentally noxious substances. These coatings demonstrate a tendency to be adhesive to many materials, and based on their low energy surfaces are easily cleaned if contaminated.

A major problem associated with this technology is the use of the 2-isopropenyl-2-oxazoline monomer in the production of the 2-isopropenyl-2-oxazoline/methyl methacrylate copolymer. This monomer is highly toxic: ingestion, $LD_{50}=100-200$ mg per kg; skin absorption, $LD_{50}=20-40$ mg per kg. Therefore, its use in any commercial application necessarily requires the nearly complete removal of residual monomer from the polymer.

This deficiency in oxazoline or oxazine polymerization is well recognized in the art. Thus, there are numerous patents which teach techniques for scavenging monomeric 2-isopropenyl-2-oxazoline following a polymerization.

The low molecular weight of such polymers is also a problem. The polymerization of 2-isopropenyl-2-oxazoline monomer has been demonstrated (see, e.g., D. A. Tomalia, B. P. Thill, and M. J. Fazio, "Ionic Oligomerization and Polymerization of 2-Alkenyl-2-oxazolines," *Polymer Journal*, Vol. 12, No. 9, pp. 661–675, 1980) by using an anionic initiator such as n-butyl lithium under anhydrous and oxygen-free conditions. Polymerization has also been demonstrated using radical initiators. However, the polymers produced by either of these routes possess very low molecular weights (i.e., less than 2500). Attempts to produce higher molecular weight products (e.g., by using lower anionic initiator concentrations) were unsuccessful. Both mechanistic pathways undergo the same side reaction of hydrogen abstraction of the reactive methyl group attached to the vinyl group of the 2-isopropenyl-2-oxazoline. This side reaction is competitive with polymerization, which inhibits the formation of higher molecular weight polymers. A need therefore exists for a synthetic route to poly(2-isopropenyl-2-oxazoline) and its various copolymers that circumvents use of the highly toxic monomer, 2-isopropenyl-2-oxazoline.

SUMMARY OF THE INVENTION

In the present invention, poly(methacrylic ester) is converted to an oxazoline-or oxazine-containing polymer or copolymer, thus circumventing the use of the highly toxic monomer, 2-isopropenyl-2-oxazoline or 2-isopropenyl-2-oxazine. These and other objects, advantages; and features of the present invention will be more fully understood and appreciated by reference to the written specification.

DESCRIPTION OF THE PREFERRED EMBODIMENT

General Scheme

In the preferred embodiment of the present invention, a polymer or copolymer of poly(2-isopropenyl-2-oxazoline) or poly (2-isopropenyl-2-oxazine) is produced by a monomer-free route according to the following scheme:

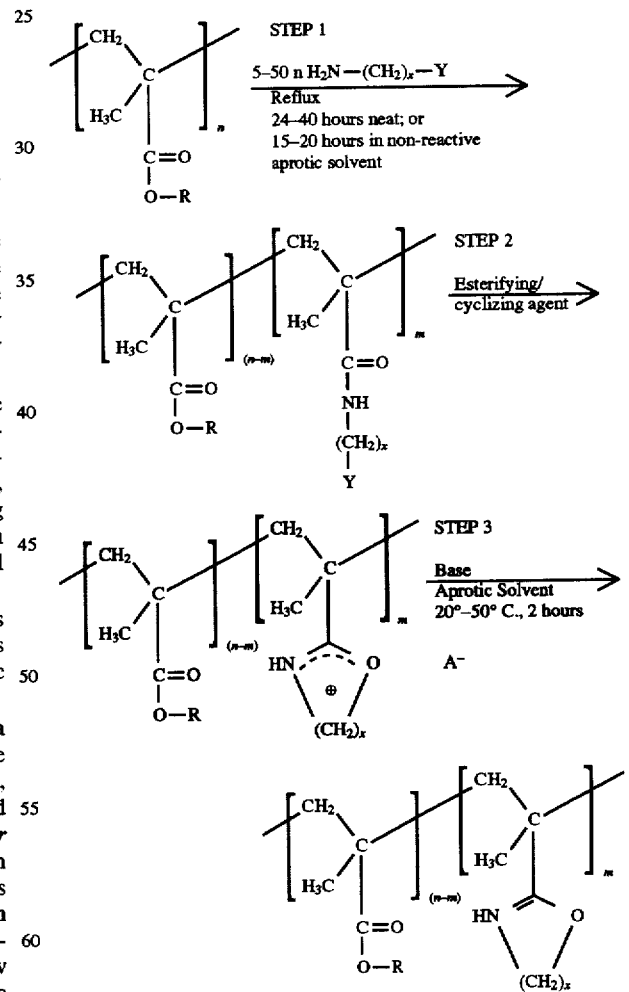

where R is $C_1$ to $C_4$ alkyl, x=2 or 3 and Y is any leaving group.

A leaving group is the group displaced in a substitution or elimination reaction. A "good" leaving group should have a weak and highly polarized C—X bond. After departure, X⁻ should be a very stable ion. If this ion can be effectively solvated, its leaving group ability is enhanced. Typical good leaving groups are Br, I, OTs, OMs, and Cl. In the most preferred embodiment, leaving group Y is ⁻OH, i.e., the reactant utilized in Step 1 is either ethanolamine (2-aminoethanol) or propanalamine (3-aminopropanol). The discussion of the preferred embodiment and examples below refer specifically to those reactants.

The formation of the oxazine may be preferred for some applications where lower reactivity is desired. The oxazine ring is less reactive than the oxazoline ring.

Step 1

The first step involves the conversion of poly(methacrylic ester) to the corresponding poly(β-hydroxyethylacrylamide), or poly(β-hydroxypropylacrylamide) or more typically to a poly(methacrylic ester)/poly(β-hydroxyethyl (or-propyl) acrylamide) copolymer. The reaction is preferably conducted neat and then worked up, but can be conducted in an aprotic solvent. The most preferred poly(methacrylic ester) is poly(methyl methacrylate), PMMA. One major advantage to the process of the present invention over known polymerization processes of 2-isopropenyl-2-oxazoline or 2-isopropenyl-2-oxazine is the ability to produce high molecular weight polymers. This is made possible because the starting material, e.g., poly(methyl methacrylate), is commercially available in average molecular weight ranges of 15,000, 35,000, 75,000, 395,000, and 540,000 (as determined by GPC). The process of the present invention converts these high molecular weight starting materials into poly(2-isopropenyl-2-oxazoline or oxazine) polymers having the same corresponding high molecular weight.

As noted, the reflux of ethanolmine or propanolamine with the poly(methacrylic ester) can be conducted neat or in a nonreactive, aprotic solvent. The principal advantage of conducting the reflux in a nonreactive aprotic solvent such as DMSO or N-methylpyrrolidone (NMP) is that the reaction is completed more rapidly, i.e., in 15–20 hours of reflux versus 24–40 hours neat. However, reflux in DMSO, for example, tends to color the polymer undesirably. In addition, one must always worry about separating the aprotic solvent after the reaction is completed.

Refluxing neat requires more time, i.e., 24–40 hours, but results in a product which is clean and not colored. In addition, one tends on balance to obtain a higher degree of amidation to the desired hydroxyethylacrylamide or hydroxypropylacrylamide intermediary, i.e., 78–85%. Thus, the most preferred embodiment is to conduct the Step 1 reflux neat.

A sampling of amidation conditions to convert PMMA to poly(2-hydroxyethylmethacrylamide) is set forth in Table 1 below:

TABLE 1

Summary of Amidation Conditions to Convert PMMA to Poly(2-Hydroxyethylmethacrylamide) (MW ≅ 15,000)

| Example No. | Scale (PMMA in grams) | Solvent | Wt. Ratio EA/DMSO | EA Excess (Equiv. per ester) | Temp. (°C.) | Time (Hours) | % Amide | Yield |
|---|---|---|---|---|---|---|---|---|
| 5 | 10 | DMSO-EA | 25/66 | 5 | 110 | 16 | 50 | 91 |
| 6 | 10 | DMSO-EA | 70/120 | 10 | 140 | 16 | 76 | 82 |
| 7 | 10 | DMSO-EA | 100/150 | 16 | 110 | 48 | 70 | 100 |
|  |  |  |  |  | 135 | 16 | 78 | 95 |
| 8 | 41 | DMSO-EA | 250/440 | 10 | 145 | 20 | 50 | 90 |
|  |  |  |  | 20 | 155 | 20 | 77 | 85 |
| 9 | 10 | DMSO-EA | 240/55 | 40 | 155 | 22 | 85 | 90 |
| (no example below) | 10 | EA only |  | 40 | 154 | 22 | 74 | 90 |
| 10 | 30 | DMSO-EA | 720/150 | 40 | 155 | 22 | 85 | 95 |

Because it is preferred that the degree of oxazoline or oxazine substitution on the final poly(2-isopropenyl-2-oxazoline) or poly(2-isopropenyl-2-oxazine) copolymer be greater than or equal to 60%, more preferably 80%, and most preferably complete, it is desirable for the reaction conditions in the amidation step to be such as will 60% to 80%, and most preferably completely, convert methyl esters to β-hydroxyamides. Thus, if n in the above scheme was 200, m would preferably be 120, more preferably 160, and most preferably 200. The need for some stoichiometric excess of ethanolamine (EA) or propanolamine will of course be appreciated by those skilled in the art. Thus, the ratio of EA or propanolamine to PMMA preferably is from about 5 equivalents to about 50 equivalents per PMMA ester group, more preferably 5–40 and most preferably 5–15.

Where the alkyl group of the ester is methyl or ethyl, the byproduct of the amine substitution is methyl or ethyl alcohol, either of which is fairly easily separated by evaporation or the like. If the alkyl were propyl, the propyl alcohol byproduct could similarly be evaporated, though not as readily. Where the alkyl is butyl, the butanol byproduct could be separated by dissolving it into a nonpolar solvent in a bi-phase extraction.

Step 2

The second step involves the conversion of the β-hydroxyethyl (or propyl) acrylamide/methyl methacrylate copolymer to a 2-isopropenyl-2-oxazolinium (or oxazinium) cation/methyl methacrylate copolymer. This is accomplished by using an esterifying/cyclizing agent such as mesyl chloride, thionyl chloride, oxalyl chloride, etc. These agents first form an intermediate ester at the hydroxy end of the hydroxyethyl (or propyl) acrylamide group, which ester then fairly quickly cyclizes to form the oxazolinium or oxazinium cation and an associated anion(s). Step 2 is shown specifically below for both thionyl chloride and mesyl chloride:

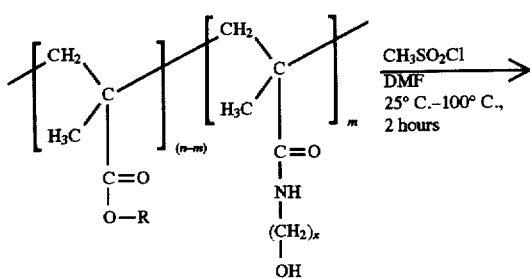

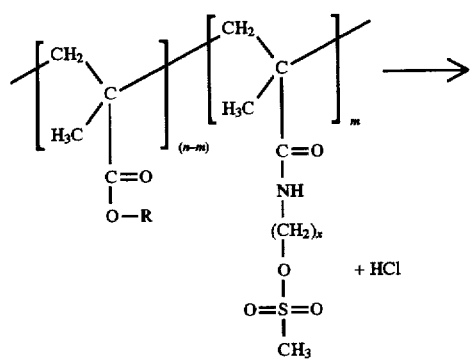

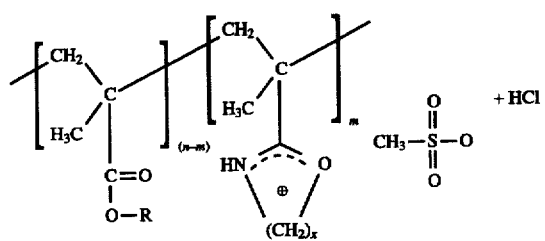

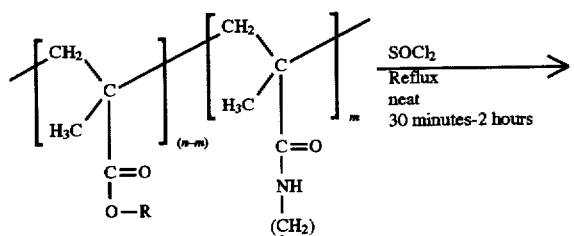

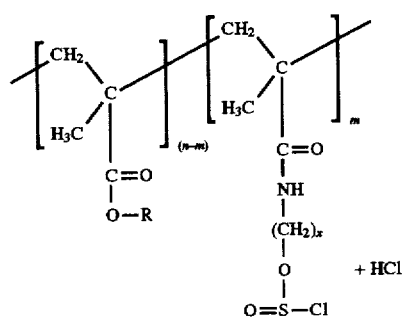

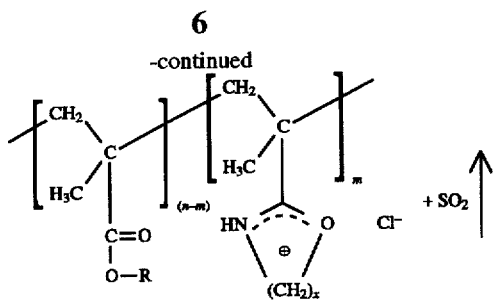

One advantage to using thionyl chloride is that the $SO_2$ end product can be fairly easily driven off with heat, whereas the mesylate anion must be separated through a salt separation process. However, the thionyl chloride reaction requires higher temperatures, i.e., refluxing, in order to proceed. Further, the length of time of the reflux must be carefully controlled to avoid excessive refluxing and thereby maximize desired end product yield. Finally, only the lower molecular weight polymers dissolve in thionyl chloride, i.e., less than about 20,000, making it necessary to find a nonreactive cosolvent for the thionyl chloride if one wants to work with and obtain as an end product a polymer with a molecular weight in excess of about 20,000.

The mesyl chloride reaction, on the other hand, proceeds relatively rapidly even at room temperature. Within about 10 minutes, a white precipitate forms. The mixture is heated to 100° C. to dissolve it and is then allowed to cool with stirring for about 2 hours.

Nonreactive cosolvents for mesyl chloride can easily be found. The examples below use DMF, which could not be used with thionyl chloride because it reacts with thionyl chloride. Mesyl chloride is the most preferred esterifying/cyclizing reagent.

Mesyl chloride is preferably reacted in the range of from about 1 to about 1.5 equivalents of mesyl chloride to hydroxyethylacrylamide group, assuming 100% conversion (in fact the conversion is typically from about 78% to about 85% as a result of Step 1). Most preferably, approximately 1.2 equivalents of mesyl chloride are used.

When thionyl chloride is used as the solvent as well as the reactant, it is obviously present in great molar excess. However, if a cosolvent were used, thionyl chloride would also be used in the range from about 1 to about 1.5 equivalents, more preferably about 1.2 equivalents, in the same way as noted above for mesyl chloride.

Step 3

The third step involves the base-promoted deprotonation/neutralization of the oxazolinium or oxazinium cation and excess acid to form the oxazoline- or oxazine-containing copolymers. The preferred base is sodium methoxide, but other bases could be used as well, such as sodium t-butoxide, sodium carbonate, and sodium hydroxide. Other acid acceptors are also contemplated.

Deprotonation/neutralization can be effected in DMF using, for example, sodium methoxide (NaOMe) as a base. The amount of base ranges from 5–10 equivalents per oxazolinium- or oxazinium-methacrylamide repeat unit. In a typical neutralization reaction, the oxazolinium or oxazinium salt is dissolved in DMF to form a reddish-brown homogeneous mixture and the base is added in small portions. The mixture is stirred at 25° C. for 2 hours and heated at 60° C. for 30 minutes. The DMF can be removed easily by co-distillation with toluene or THF after precipitation by most of the NaOMe. Spectroscopic evidence for the cyclization product comes from infrared spectroscopy with the appearance of a very strong band at 1637 cm$^{-1}$ for the C—N double bond of the oxazoline. $^1$H NMR spectrum of this product in CD$_3$OD shows a multiplet at δ4.29 for the methylene hydrogens next to the nitrogen on the oxazoline and a second similar multiplet at δ3.79 for the hydrogens on the carbon next to the oxygen of the oxazoline.

Most preferably, the DMF-oxazolinium or -oxazinium salt solution is added dropwise to a large excess of base. This helps prevent cross-linking.

Purification/Work-up

The first step in purification of the end product is distillation of the volatiles. This removes 80–90% of the volatiles. The resulting crude product is then redissolved/suspended in methanol and subjected to either diafiltration/ultrafiltration or to filtration/dialysis/ultrafiltration.

The most preferred technique utilizes diafiltration. The porosity of the diafiltration membrane can be adjusted depending on the molecular weight of the end product. For most applications, one can use a regenerated cellulose membrane with a 3000 molecular weight cutoff. Pump pressure is set at 20 liters/minute and the back pressure is set at 30 psi. Methanol is continuously added to the retentate to maintain a permeate (filtrate) flow of 50–70 milliliters/minute. The retentate volume is steadily reduced as the salt is removed from the permeate.

The resulting process fluid is then ultrafiltered at a constant volume with methanol until eight retentate volumes of permeate are obtained. The retentate volume is then removed and the ultra filtration filtration device washed three times. The combined retentate and washes are then filtered through Whatman No. 1 later paper. The filtrate is evaporated of volatiles and the resulting residue evacuated at a high vacuum at 25° C. for about 18 hours.

The alternative filtration/dialysis or ultrafiltration approach involves first pouring the dissolved/suspended crude product into an equal volume of toluene in order to precipitate the salts present. This is then filtered in a Büchner funnel containing course porosity (particle retention greater than 20 microns) fast flow later paper. The filtrate is evaporated using a rotary evaporator at 28 inches of mercury vacuum with a bath at 45°–50° C. The residue is then dissolved in methanol and is either ultrafiltered or poured into dialysis bags. The dialysis bags are then suspended in methanol with changes of dialysate at 8, 24, and 72 hours. The contents of the bag are then collected, filtered through Whatman No. 1 later paper to remove any particles and evaporated of volatiles using a rotary evaporator. The resulting residue is evacuated at high vacuum overnight at room temperature.

Modifications of the Ester Portion of the Copolymer

On one aspect of the invention, where conversion of the poly(methacrylic ester) to the oxazine or oxazoline containing polymer is less than 100%, at least some of the remaining pendent ester groups can be modified to modify the characteristics of the copolymer. Thus, fluorides can be substituted to make the copolymer "slipperier." UV stabilizers can be substituted. Adhesion promoters such as imidazolines can be substituted. Cure rate enhancers can be substituted. Combinations of the foregoing substitutions can be made.

Alternate Preferred Embodiment

Another approach involves a thermally-induced cyclization-dehydration of β-hydroxyethyl (or propyl) methacrylamide polymer to the desired oxazoline- or oxazine-containing polymer. The amidation step, step 1, remains the same. However, step 2 is different in that it involves the direct cyclization of the hydroxyamide derivative, obviating the step of replacing the —OH group, as outlined below:

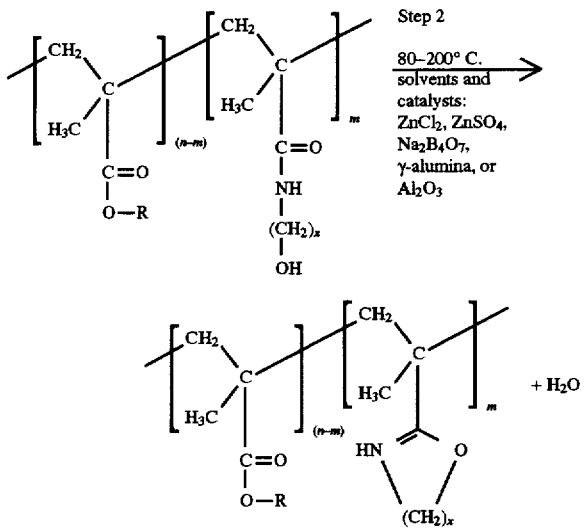

This cyclization requires high temperatures (80°–200° C.), though the temperature must be kept sufficiently low so that thermal degradation of the polymer does not occur. A catalyzed cyclization-dehydration may significantly lower the optimum temperature. High boiling point solvents (preferably 200° C. or greater) should be used. A suitable solvent for use is propylene glycol. Suitable catalysts include, but are not limited to, zinc chloride (ZnCl$_2$), zinc sulfate (ZnSO$_4$), boron esters, and aluminum alkoxides.

EXAMPLES

The following examples are illustrative of the preferred embodiments. These examples are not intended to limit or otherwise restrict the scope of the invention in any way.

Step 1 Examples

Example 1—Preparation of Poly(2-hydroxyethylmethacrylamide) from Poly(methyl methacrylate) and Ethanolamine To a 500 mL one neck round bottom flask containing a stir bar was added ethanolamine (245 g, 4 mol, 20 equivalents per ester) and poly(methyl methacrylate) (20 g, 200 mmol ester). This mixture was heated at 175°–180° C. in a constant temperature bath with the flask attached to a reflux condenser under N$_2$ for 19 hours. The polymer melts and settles to the bottom of the flask as the mixture is warmed. The mixture becomes homogenous as reflux commences. The resulting clear, colorless solution was cooled to 25° C. This mixture was fitted with a short path distillation head and the volatiles of the mixture removed with a bath at 100°–120° C. and at a vacuum of 1.5 mm Hg to remove the bulk of the ethanolamine (EA). To remove residual EA from the viscous residue the temperature of the bath was raised to 150°–165° C. until distillation stopped. This viscous residue was dissolved in 100 mL of MeOH and the resulting mixture added dropwise from a dropping funnel to 3.5 L of mechanically stirred toluene. The white precipitate was filtered with a Büchner funnel containing Batman No. 4 filter paper. The white powder was dried overnight at 25° C. under high vacuum. Analysis of this material indicated residual ethanolamine (~13%) present in the polymer (δ2.77 ppm). The powder was dissolved in 40 mL of MeOH and stirred overnight with 90 mL wet volume of G-24 Dowex ion-exchange resin, strongly acidic cation, 8% cross-linking, 100–200 mesh. Analysis of an aliquot of this mixture after 18 hours by $^1$H NMR spectroscopy indicated no detectable EA. The resin was filtered from this mixture. The volatiles were removed from the filtrate to give a clear sticky material. This material was redissolved in a maximum of MeOH and added dropwise to toluene as described above to give after drying 20 g (90% yield) of the product as a white powder: $^1$H NMR (CD$_3$OD, Me$_4$Si) δ0.8–1.5 (br, m, (4H)), 1.6–2.0 (br, m, 4H), 3.15–3.40 (br, m, 2H), 3.5–3.8 (br, m, 2H). IR (film) 3348, 2930, 1717, 1656, 1717, 1656, 1529, 1206, 1178, 1082 cm$^{-1}$.

Example 2—Preparation of Poly(2-Hydroxyethylmethacrylamide) (MW=35,000) Using 8 Equivalents of EA: Removal of Residual Ethanolamine by Codistillation with N-Methylpyrrolidone To a 500 ml one neck round bottom flask containing a large stir bar was added poly(methylmethacrylate) (MW=35,000) (52 g, 520 mmol of ethanolamide maximum) and ethanolamine (257 g, 4.2 moles, 8 equivalents per ester). This mixture was stirred and placed in an oil bath at 170° C. for 24 hours under N$_2$. This mixture was cooled to ~30°–40° C., the condenser placed with a distillation head and the volatiles removed by high vacuum with a pot temperature from 120°–200° C. To this viscous mixture was added 100 mL of N-methylpyrrolidone (NMP) and the resulting mixture heated to ~100° C. to form a homogeneous solution. This mixture was distilled of volatiles from 100° to 150° C. at high vacuum until distillation stopped. This procedure was repeated with a second 100 mL. aliquot of NMP. An aliquot of this resulting mixture was analyzed by $^1$H NMR spectroscopy to contain some residual NMP and no detectable ethanolmine. The product is stored as a 50% by weight solution in NMP.

Example 3—Preparation of Poly(2-Hydroxyethylmethacrylamide) From Poly(methyl methacrylate) and Ethanolamine To a 500 mL one neck round bottom flask with a large stir bar was added poly(methyl methacrylate) (MW=15,000) (30 g, 300 mmol ester) and ethanolmine (320 g, 5.24 mol, 17.5 equivalents per ester). The mixture was heated at 175°–180° C. and stirred for 15 hours with an attached reflux condenser fitted with an N$_2$ bubbler. The resulting mixture was cooled to ~50°–80° C. and the reflux condenser replaced with a short path distillation head. The volatiles were removed at 100°–150° C. at 1–5 mm Hg vacuum followed by 160°–180° C. until distillation ceased. To the cooled residue was added 250 mL of MeOH and the distillation head replaced with a reflux condenser. This mixture was heated to 110° C. (at bath) to reflux the MeOH until a clear, homogeneous mixture was obtained. This mixture was cooled to 25° C. and diluted to 800 mL total volume with MeOH. An aliquot of this mixture was evaporated of volatiles and analyzed with $^1$H NMR spectroscopy in CO$_3$OH to contain 21% weight (10 g of EA or 164 mol). This mixture was stirred overnight with 100 mL wet volume of G-24 strongly acidic cation exchange resin (200–400 mesh, 2 mol per liter wet volume) (from Dow Chemical Co.) for 18 hours under nitrogen. The volatiles of an aliquot of this mixture was analyzed by 1H NMR spectroscopy to contain no detectable ethanolamine. The resin was filtered from the mixture in a large Büchner funnel containing filter paper. The methanol was removed by a rotary evaporator at 26 inches of Hg and 45°–50° C. The resulting residue was heated at 50° C. overnight at high vacuum to give 35 g (90% yield) of the title compound as a white crusty powder.

Example 4—Preparation of Poly(2-hydroxyethylmethacrylamide) from Poly(methyl methacrylate) (MW=75,000) and Ethanolamine To a 2 L one neck round bottom flask containing a large stir bar was added poly(methyl methacrylate) (MW=75,000) (150 g, 1.5 mmol methyl ester) and ethanolamine (EA) (642 g, 10.5 mol, 7 equivalents per ester). This mixture was heated at 200° C. for 6 hours and 180°–185° C. for 28 hours in a constant temperature bath with the flask attached to a reflux condenser connected to a nitrogen bubbler. The polymer melts and settles to the bottom of the flask as the mixture is heating. The mixture becomes homogeneous after about one hour heating. The resulting clear, colorless mixture was cooled to ~50° C. The reflux condenser was replaced with a short path distillation head. The volatiles of this mixture (excess ethanolamine and methanol byproduct) were removed by distillation with an oil bath ranging from 100°–120° C. and a vacuum of 1–2 mm Hg to remove the bulk of the ethanolamine. To remove more of the residual EA from the viscous polymer mixture the temperature of the bath was raised to 150°–165° C. until distillation stopped. The mixture was cooled to ~100° C. and the attached distillation head was replaced with a reflux condenser. The mixture was mixed with 1 L of methanol and gently refluxed under N$_2$ until a homogeneous solution was obtained. This mixture was cooled to room temperature. An aliquot of this mixture was evacuated of volatiles and analyzed by $^1$H NMR spectroscopy to contain 30% by weight EA by integration (~56 g EA or 940 mmol NH$_2$). To this mixture was added 4 L of MeOH and 1 L wet volume of G-24 strongly acidic cation exchange resin (200–400 mesh, 2 mol of SO$_3$H per liter wet volume, from Dow Chemical Co.) and the resulting mixture stirred for 18 hours under N$_2$. The volatiles of an aliquot of this mixture were analyzed by $^1$H NMR spectroscopy to contain no detectable ethanolamine. The resin was filtered from the mixture and washed with 2×200 mL of MeOH. The combined filtrates were evaporated of volatiles on a rotary evaporator at 26 inches of Hg and 45°–50° C. The resulting residue was heated at 50° C. overnight at high vacuum to give 118 g (91% yield) of the title compound as a white crusty powder.

Example 5—Preparation of Poly(2-Hydroxyethyl Methacrylamide) (MW≡15,000) with 50% Amide-50% Ester To 60 mL of dimethylsulfoxide (DMSO) was added poly(methyl methacrylate) (avg. MW≡15,000 by GPC) (10 g, 100 mmol of repeat unit) and ethanolamine (25 g, 409 mmol, 4 equiv. per ester). This mixture was heated at 110° C. for 18 hours under N$_2$. This mixture was cooled to 25° C. and the volatiles removed by vacuum distillation using a short path distillation unit with the heat bath at 110° C. and a vacuum of 0.1 torr. The resulting viscous mixture was dissolved in a minimum of methanol (MeOH) and added dropwise to 1.5 L of rapidly stirred toluene. The toluene was decanted and the resulting viscous solid was redissolved in MeOH. The volatiles were removed on a rotary evaporator at 28 in. Hg with a bath at 45° C. and the resulting residue evacuated at high vacuum overnight at room temperature to give 10 g of the desired product. Analysis of this material by infrared spectroscopy indicated a band at 1762 cm$^{-1}$ for the carbonyl of unreacted ester and a band at 1653 cm$^{-1}$ for the carbonyl of the amide. An analysis by $^1$H NMR spectroscopy indicated 30% substitution as the amide by integration of methyl ester versus ethanolamide signals.

Example 6—Preparation of Poly(2-Hydroxyethyl Methacrylamide) with 70–85% Amide and 15–30% Ester To 60 mL. of dimethylsulfoxide (DMSO) was added poly(methyl methacrylate) (avg MW≅15,000 by GPC) (10 g, 100 mmol of repeat unit) and ethanolamine (60 g, 1.0 mol, 10 equiv. per ester). This mixture was heated at 145° C. for 20 hours under N$_2$. This mixture was cooled to 25° C. and the volatiles removed by vacuum distillation using a short path distillation unit with the heat bath at 110° C. and a vacuum of 0.1 torr. The viscous mixture was dissolved in a minimum of MeOH and added dropwise to 1.5 L of rapidly stirred toluene. The toluene was decanted and the resulting viscous solid was redissolved in MeOH. The volatiles were removed on a rotary evaporator at 28 in. Hg with a bath at 45° C. and the resulting residue evacuated at high vacuum overnight at room temperature to give 10 g of the desired product. Analysis of this material by infrared spectroscopy indicated a band at 1762 cm$^{-1}$ for unreacted ester carbonyl and a band at 1653 cm$^{-1}$ for the amide carbonyl for the desired material. An analysis by $^1$H NMR spectroscopy indicated 80% substitution as the amide by integration of methyl ester versus ethanolamide signals.

Example 7—Preparation of Poly(2-Hydroxyethylmethacrylamide) from Poly(methyl methacrylate) (MW≅15,000) and 16 Equivalents of Ethanolamine To a 500 ml round bottom flask containing a stir bar was added poly(methyl methacrylate) (PMMA) (10 g, 110 mmol, MW≅15,000), ethanolamine (100 g, 1.64 mol, 16 equivalents per ester) and DMSO (150 g). This homogeneous mixture was stirred at 110° C. for 48 hours. Au aliquot of this mixture was worked up (strip volatiles, redissolve in MeOH and precipitate from toluene) and analyzed by infrared spectroscopy to contain 70% amide and 30% methyl ester. The mixture was further heated at 135° C. for 16 hours. The volatiles were removed by distillation using a short path distillation head at 2–3 mm Hg with a bath at 120°–150° C. The resulting viscous mixture was dissolved in a minimum of MeOH and added dropwise to mechanically stirred toluene. The toluene was poured off and the viscous residue dissolved in MeOH. Decolorizing charcoal was added to the polymer—MeOH mixture and this resulting mixture passed through a Büchner packed with a layer of Celite and more decolorizing charcoal. The clear almost colorless MeOH mixture was evaporated of volatiles on a rotary evaporator at 26 inches of Hg with a bath at 45° C. The resulting reddish-brown residue was evacuated at 25° C. overnight at high vacuum to give 10 g of the desked product. Analysis of the material by infrared spectroscopy on a KBr disk (solution in anhydrous MeOH followed by high vacuum for 30 minutes) indicated 78% amide and 22% ester.

Example 8—Preparation of Poly(2-Hydroxyethylmethacrylamide) from Poly(methyl methacrylate) (MW≅15,000) Using 10 Equivalents Followed by 20 Equivalents of Ethanolmine To a 1 L flask containing a stir bar was added poly(methyl methacrylate) (41 g, 410 mmol), ethanolamine (250 g, 4.1 mol, 10 equivalents per ester) and dimethylsulfoxide (400 mL). This mixture was stirred and heated under N$_2$ at 145° C. using a constant temperature bath for 20 hours. An aliquot of this mixture was worked up (strip volatiles, redissolve in MeOH and precipitate from toluene) and analyzed by infrared spectroscopy to indicate 60% amide and 40% ester. The volatiles were completely removed from this mixture by distillation. To this remaining residue was added ethanolamine (500 g, 8.2 mol, 20 equivalents per ester) and dimethylsulfoxide (200 mL). This resulting mixture was stirred and heated at 155° C. for 20 hours. The mixture was cooled to 25° C. and the volatiles removed by distillation through a short path distillation column at 1 mm Hg and a bath at 120°–150° C. The resulting viscous residue was dissolved in a minimum of MeOH and the resulting mixture was added dropwise to 4 L of toluene mixed by a mechanical stirrer. The toluene was decanted from the viscous residue. This mixture was redissolved in methanol. The resulting mixture was evaporated of volatiles on a rotary evaporator to give a light reddish-brown solid. This solid was evacuated at 25° C. overnight under high vacuum to give 38 g of the desired product. Analysis of this product by infrared spectroscopy (anhydrous MeOH solution on a KBr plate and evacuated high vacuum) indicated 77% amide and 23% ester.

Example 9—Preparation of Poly (2-Hydroxyethylmethacrylamide) from Poly(methyl methacrylate) (MW≅15,000) Using 40 Equivalents of Ethanolamine To a 500 mL one-neck round bottom flask containing a stirrer was added poly(methyl methacrylate) (MW≅15,000 by GPC) (10 g, 100 mmol ester), ethanolamine (240 g, 4.0 mol, 40 equivalents per ester) and 50 mL of dimethylsulfoxide. This mixture was heated with stirring for 22 hours using a constant temperature bath and under nitrogen with the flask attached to a reflux condenser. The mixture at 154° C. was homogeneous and clear. After 3–4 hours at this temperature the mixture turned a slight green color. This mixture was cooled to room temperature and distilled of volatiles using a short path distillation head at 120°–140° C. with a 1–3 mm Hg until distillation stopped. The resulting viscous residue in the distillation pot was dissolved in 100 mL of MeOH and filtered with Whatman No. 1 filter paper in a Büchner funnel. The resulting methanol mixture was added dropwise from a dropping funnel to 1.5 L of rapidly stirred toluene. The toluene was decanted and the resulting residue dissolved in methanol. The resulting methanol mixture was stripped of volatiles on a rotary evaporator at 26 inches of Hg at 45° C. This resulting residue was evacuated at high vacuum for 18 hours at room temperature to give 13 g of the desired product. Analysis of this material by infrared spectroscopy (dilute solution in anhydrous MeOH on a KBr disk and evacuated at high vacuum in a bell jar for 30–60 minutes) indicated relative percentages of 85% amide and 15% ester. An analysis of this mixture by $^1$H NMR spectroscopy (a 2% solution in CD$_3$OD) indicated a signal for the methyl ester at δ3.27 ppm and two multiplates at δ3.30 ppm and δ3.63 ppm for oxazoline. The material was contaminated with residual ethanolamine with triplets at δ2.76 ppm and δ3.56 ppm.

Example 10—Preparation of Poly(2-Hydroxyethylmethacrylamide) from Poly(methyl methacrylate) (MW≅15,000) Using 40 Equivalents of Ethanolamine and Dimethyl Sulfoxide: Larger Scale Synthesis To a 1 L round bottom one-neck flask containing a stir bar was added poly(methyl methacrylate) (30 g, 300 mmol, avg.

MW≡15,000), ethanolamine (720 g, 11.8 mol, 40 equivalents per ester) and dimethylsulfoxide (150 mL). This mixture was heated at 145° C. under a blanket of nitrogen for 22 hours with stirring. The reaction vessel was attached to a reflux condenser. This mixture was cooled to 25° C. and distilled of volatiles by replacing the reflux condenser with a short path distillation heat using a bath at 120°–140° C. and a vacuum of 1–3 mm Hg. The resulting viscous pot residue was dissolved in 800 mL of MeOH and filtered with Whatman No. 1 paper in a Büchner funnel to remove insoluble material. This clear reddish-brown solution was added via a dropping funnel to mechanically stirred toluene (4 L). A fluffy white material precipitated from the toluene, was filtered with Whatman No. 4 filter paper and washed with 2×100 mL portions of toluene. The solid was redissolved in a minimum of methanol and this resulting mixture evaporated of volatiles on the rotary evaporator at 26 inches of Hg with a bath at 45° C. This solid residue was evacuated at high vacuum overnight at 25° C. to give 35 g (91%) of the desired product. Analysis of this material by infrared spectroscopy (anhydrous MeOH solution of polymer or a KBr disk evacuated in a bell jar at high vacuum 30–60 minutes) indicated relative percentages of 85% amide (1656 cm$^{-1}$) and 15% ester (1729 cm$^{-1}$). A $^1$H NMR spectrum of this material (2% solution in $CD_3OD$ and $Me_4Si$) as an internal standard indicated a signal for methyl ester at δ3.28 ppm, a broad triplet at δ3.34 ppm and δ3.68 ppm for the ethyl group of the ethanolamide.

Step 2 and 3 Examples: Using Mesyl Chloride

Example 11—Preparation of Poly(isopropenyl-2-oxazoline/methyl methacrylate) Copolymer: Dialysis in Deionized Water To a 100 mL round bottom flask containing a stir bar was added poly(2-hydroxyethylmethacrylamide) (3.0 g, 23.2 mmol) and 24 mL of dimethylformamide. This mixture was heated and stirred to produce a homogenous solution. To this mixture cooled to room temperature was added dropwise methanesulfonyl chloride (2 mL, 2.96 g, 25.9 mmol, 1.1 equivalents per OH) and the resulting mixture was stirred at room temperature for 2 hours. To this mixture was added 30 mL of DMF. Sodium methoxide (5 g, 92.6 mmol, 4 equivalents per OH, 3.6 equivalents per MsCl) which was slowly poured into this mixture while stirring rapidly. This mixture was stirred for 2 hours at room temperature. The volatiles were removed from the mixture by short path distillation with a bath at 110°–140° C. and a vacuum at 50–100 torr. The solid residue was dissolved in 100 mL of deionized water and dialyzed for 48 hours using a Spectra/Por-6 dialysis membrane MWCO 3500. The contents of the dialysis bag were removed and the volatiles of this mixture were evaporated using a rotary evaporator. The mixture was redissolved in a minimum of MeOH and the resulting mixture evaporated of volatiles. Residual volatiles were removed by high vacuum overnight at room temperature giving 3 g poly(2-isopropenyl-2-oxazoline/methyl methacrylate) copolymer. A $^1$H NMR spectrum of this mixture indicated 57% oxazoline with some residual impurities present.

Example 12—Preparation of Poly(IPO/MMA): Addition of a DMF Solution of the Poly (oxazolinium methyl sulfate/MMA) to Sodium Methoxide in Methanol To a 100 mL round bottom flask with a stir bar was added poly(2-hydroxyethylmethacrylamide) (3.0 g, 23.3 mmol) and 9 mL of DMF. This mixture was heated to ~100° C. and stirred to produce a homogenous solution. To this mixture at 25° C. wa added methanesulfonyl chloride (2.96 g, 25.8 mmol, 1.1 equivalents per OH). This mixture was stirred at room temperature for 2 hours. The polymer mixture was transferred to a separatory funnel with a small rinse of DMF to remove material. This mixture was added dropwise to a stirred mixture of sodium methoxide (5 g, 9 mmol, 4 equivalents) in 50 mL of methanol. This resulting mixture was stirred at 25° C. for 2 hours. This mixture was poured into a Spectra/Por 3500 MWCO dialysis bag and dialyzed in MeOH for 48 hours with 4 charges of MeOH. The contents of the dialysis bag were removed and the volatiles evaporated by rotovap to give a white powder. High vacuum evacuation overnight at 25° C. gave 3.0 g of the desired product.

Example 13—Preparation of Poly(IPO/MMA) Derived from Poly(2-Hydroxyethylmethacrylamide) (MW=35,000): Purification by Tangential Flow Ultrafiltration, 3K Membrane To a 250 mL one neck round bottom flask containing a stir bar was added poly(2-hydroxyethylmethacrylamide) (3.0 g, 23.3 mmol OH maximum) and 30 mL of dimethylformamide (DMF). This mixture was heated to 100° C. and stirred until a homogeneous mixture was obtained. This mixture was cooled to 25° C. To this resulting mixture was added methanesulfonyl chloride (3.2 g, 28 mmol, 1.2 equivalents per OH) dropwise. This was stirred at room temperature for 2 hours. To this mixture was added 30 mL, of MFD followed by sodium methoxide (6.1 g, 112 mmol, 4 equivalents per mesyl chloride). The sodium methoxide was slowly poured into the mixture. Within a few minutes the mixture becomes very hot. The mixture was rapidly stirred for 2 hours at room temperature. The volatiles were removed by distillation using a short path distillation head. The residue was dissolved in a minimum of MeOH and slowly poured into two times this volume of stirred toluene. This mixture was filtered in a large Büchner funnel using Whatman No. 4 filter paper. The filter paper was replaced 4–5 times during filtration. The clear toluene mixture was evaporated using a rotary evaporator at 20 inches Hg with a 45°–50° C. bath. This residue was dissolved in MeOH to form a 5–10% solution and placed in a plastic jug for ultrafiltration. This retentate volume was recirculated through an Amicon Thin Channel ultrafiltration plate containing an Amicon YM3 regenerated cellulose membrane. A total of 11 retentate volumes of permeate was filtered. The retentate was removed from the system. The system was washed three times each with a retentate volume of MeOH. The four volumes were collected and evaporated on a rotary evaporator to give 2.3 g (89% yield) of poly(IPO/MMA). Analysis of this mixture by $^1$H NMR spectroscopy in $CD_3OD$ indicated an oxazoline content of 81%.

Example 14—Preparation of Poly(IPO/MMA) from Poly(2-Hydroxyethylmethacrylamide) (MW=15, 000: Purification by Tangential Flow Ultrafiltration, with a 1K Membrane To a 250 mL one neck round bottom flask containing a large stir bar was added poly(2-hydroxyethylmethacrylamide) (repeat unit MW=129) (5.0 g, 38.76 mmol of OH maximum) and 30 mL of dimethylformamide. This mixture was stirred in an oil bath at 100° C. under $N_2$ until a homogeneous mixture formed. This mixture was cooled to room temperature (~25° C.). To this mixture was added dropwise methanesulfonyl chloride (MW= 114.55) (5.3 g, 46.51 mmol, 1.2 equivalents per OH). After the mesyl chloride was added, a precipitate formed in the mixture. This heterogeneous mixture was heated until it became homogeneous and allowed to cool by itself. This mixture was stirred under $N_2$ for 2 hours at room temperature. To this mixture was added 30 mL of DMF. Sodium methoxide (10 g, 185 mmol, 4 equivalent per MsCl) was poured in over ~1 minute to a rapidly stirred mixture. The resulting mixture became very warm and began to bubble and foam for about 3 minutes. The resulting mixture was stirred for 2 hours at 25° C. This mixture was distilled of volatiles using a distillation head until a solid residue remained in the pot. This residue was dissolved in a minimum of MeOH and the mixture poured into twice the volume of magnetically stirred toluene. This mixture was filtered in a large Büchner funnel using Whatman No. 4 filter paper, replacing the paper about every ¼ of the membrane. The filtrate was evaporated and the resulting residue dissolved in a minimum of MeOH. This mixture was placed in a retentate vessel of an Amicon thin channel flat stock ultrafiltration device and ultrafiltered at 28-35 psi across an Amicon YM1 (1,000 MWCO) membrane collecting 7 retentate volumes of permeate. The retentate was removed and the retentate bottles and system washed 3 times with a volume of MeOH equivalent to the retentate volume. The collected volumes were evaporated on a rotary evaporator and the resulting residue evacuated at high vacuum overnight at room temperature to give 2.6 g (62% yield) of the desired poly(IPO/MMA). A $^1H$ NMR spectrum of this mixture in $CD_3OD$ indicates no detectable impurities and an oxazoline content of 81%. The poly(2-hydroxyethylmethacrylamide) starting material was derived from 5 equivalents of ethanolamine, 182° C. for 26 hours.

Example 15—Preparation of Poly(2-isopropenyl-2-oxazoline/methyl methacrylate) Copolymer Derived from Poly(2-Hydroxyethylmethacrylamide) MW= 15,000

To a 500 mL one neck round bottom flask containing a large stir bar was added poly(2-hydroxyethylmethacrylamide) 20 g., 155 mmol of OH maximum) and 160 mL of DMF. This mixture was heated to 120° C. and stirred to give a homogeneous solution. To this mixture, cooled to 25° C., was added dropwise methanesulfonyl chloride (25 g, 253 mmol, 1.6 equivalents per OH). The mixture was heated at 65° C. for 2 hours. The volatiles were removed by distillation using a short path distillation heat at 120° C. with a 1-5 mm Hg vacuum. The resulting viscous residue was dissolved in 400 mL of DMF. To this rapidly stirred mixture was slowly poured sodium methoxide (60 g, 1.11 mol, 4.4 equivalents per mxCl). The mixture became very warm the first 30 minutes. This resulting heterogeneous mixture was stirred for 2 hours at 25° C. and for 1 hour at 60° C. The volatiles were removed by distillation using a short path distillation head with the bath from 80°-140° C. and the vacuum from 10 mm Hg to 2 mm Hg. This residue was dissolved in 1500 mL of MeOH to give a light brown homogeneous mixture. This mixture was poured into 3 L of toluene and mixed. This mixture was filtered in a large Büchner funnel containing course porosity (particle retention>20 µ) fast flow filter paper. The filtrate was evaporated on a rotary evaporator at 28 inches of Hg with a bath at 45° C. The resulting residue was dissolved in a minimum of MeOH and added dropwise to rapidly stirred ether (500 mL). The precipitate was filtered in a Büchner funnel and air dried for 30 minutes. The precipitate was dissolved in 350 mL of MeOH. Two 25 cm long Spectra/Por 3500 MWCO dialysis bags were cut and soaked in deionized water. The bags were filled with the crude poly (IPO/MMA) solution and dialyzed (each bag ~175 mL) in 2 L of MeOH per bag with changes of MeOH at 4 h, 8 h, 12 h and 24 h. The contents of the bags were evaporated of volatiles using a rotary evaporator and the resulting contents were evacuated at high vacuum overnight at room temperature to give 12 g (70% yield) of the title compound. Analysis of an aliquot of this product by $^1H$ NMR spectroscopy ($CD_3OD$, $Me_4Si$) indicated 81% oxazoline, 19% methyl ester by integration of the corresponding signals. This material is stored as a 10% solution in deionized water at ~5° C.

Example 16—Preparation of Poly(2-isopropenyl-2-oxazoline/methyl methacrylate) Copolymer from Poly(2-hydroxyethylmethacylamide/methyl methacrylate) Using Methanesulfonyl Chloride To a 100 mL round bottom flask with a stir bar was added poly(2-hydroxyethylmethacrylamide) (3.0 g., 23 mmol hydroxyethylamide maximum) and 20 mL of DMF. This mixture was heated and stirred under $N_2$ to make a homogeneous clear solution. To this mixture cooled at ~5° C. was added dropwise methanesulfonyl chloride (4.0 g, 34.9 mmol, 1.5 equivalents per OH). This mixture was stirred at 5° C. for 30 minutes followed by 40° C. for 2 hours. The volatiles of this mixture was distilled using a short path distillation head at 90°-100° C. with a 5-10 mm Hg vacuum. This residue was dissolved in 30 mL of DMF and the resulting solution mixed with sodium methoxide (5.0 g, 92.6 mmol, 4 equivalents base per hydroxamide). This mixture was rapidly stirred at room temperature for 2 hours followed by 30 minutes at 60° C. the volatiles were removed from this mixture by distillation from a short path distillation head using 100°-120° C. oil bath and a vacuum of 5-10 mm Hg. The resulting solid residue was dissolved in 100 mL of MeOH. The mixture was slowly poured into 1L of rapidly stirred toluene. This mixture was filtered in a large Büchner funnel using Whatman No. 4 filter paper. This material was dried under high vacuum overnight at 25° C. to give 2.6 g crude product. Analysis of this material by infrared spectroscopy indicated an amide type band at ~1603 cm-1 contaminated the 1653 $cm^{-1}$ band for the oxazoline moiety. A $^1H$ NMR spectrum of this material indicated the desired methyl ester/oxazoline content of 24%/76%, however, a relatively large peak at δ8.5 contaminated the sample. This material was dissolved in 50 mL of MeOH and added to a Spectra/Por dialysis bag with molecular weight cutoff at 3500. This material was dialyzed for 24 hours at 25° C. in a 2 L wide mouth bottle full of MeOH. The methanol was replaced every 4 hours the first 12 hours. The solution in the dialysis bag was removed and stripped of volatiles on a rotary evaporator to give 1.2 g (47% yield) of a light brown solid. This mixture was analyzed by infrared spectroscopy and $^1H$ NMR spectrum of this material indicated two broad multiplets of δ3.77 ppm and δ4.28 ppm for the oxazoline moiety and a signal at δ3.63 ppm for methyl group of the methyl ester. Integration of these signals indicated 76% oxazoline and 22% methyl ester: $^1H$ NMR ($CD_3OD$, $Me_4Si$) /δ, 0.8-1.6 (br, m, 4H), 1.7-2.1 (broad multiplet, 2H), 3.63 (s, 3H), 3.77 (broad triplet, 2H), 4.28 (broad multiplet); IR (film) 2900, 1730, 1657, 1460, 1446, 1384, 1346, 1195, 985, 952 $cm^{-1}$.

Example 17—Preparation of Poly(2-isopropenyl-2-oxazoline/methyl methacrylate) Derived from Poly (2-Hydroxyethylmethacrylamide) (MW=75,000)

To a 1 L three neck round bottom flask fitted with a gas inlet tube attached to a $N_2$ bubbler, a mechanical stirrer and a stopper was added poly(2-hydroxyethylmethacrylamide) (50 g, 387 mmol OH maximum) (prepared from poly (methyl methacrylate) MW=75,000) and 300 mL of DMF. This attire was heated to 120° C. and stirred until a homogeneous solution was obtained. To this stirred mixture cooled to 25° C. was added methanesulfonyl chloride (53 g, 465 mmol, 1.2 equivalents per OH). A white precipitate formed in the mixture within 5 minutes after the addition of mesyl chloride and the resulting mixture heated to give a clear homogeneous mixture. This mixture was allowed to stir without further heating for 2 hours. This resulting mixture was poured into a dropping funnel attached to a 2 L three neck round bottom flask fitted with a gas inlet adapter attached to a $N_2$ bubbler and a mechanical stirrer. The mesylate—DMF mixture was added dropwise to a stirred mixture of 300 mL of DMF and sodium methoxide (110 g, 2.02 mol, 4 equivalents per mesyl chloride). The resulting mixture was stirred for 2 hours at room temperature. The volatiles of this mixture was removed by distillation using a take-off distillation head with the heat bath starting at 80° C. and finishing at 140° C. at a vacuum of 2–10 mm Hg. The distillation proceeds without converting the pot residue to a gray-white solid but leaving enough DMF to make the residue slightly fluid. This residue was mixed with 500 mL of MeOH to give a grayish-white suspension. This suspension was added to 1.5 L of stirred toluene. This mixture was filtered in a large Büchner funnel containing course porosity (particle retention>20 μ) fast flow filter paper. The filtrate was evaporated using a rotary evaporator at 28 inches of Hg vacuum with a bath at 45°–50° C. The resulting residue was dissolved in 1200 mL of MeOH and poured into 60 cm long (54 mm flat width, 9.3 mL/cm) Spectra/Por 3500 MWCO dialysis bags attached at one end to a 6-inch long polyethylene tube (33 mm OD and 2×4 mm ID) and sealed on the opposite end with a clip. The four bags were suspended in 14 L of MeOH with changes of dialysate at 8, 24, 48 and 72 hours. The contents of the bags were collected, filtered through Whatman No. 1 filter paper to remove any particles and evaporated of volatiles using a rotary evaporator and the resulting residue was evacuated at high vacuum overnight at room temperature to give 38 g (88% yield) of poly(IPO/MMA). Analysis of an aliquot of this product by $^1$H NMR spectroscopy (CD$_3$OD, Me$_4$Si) indicated 80% oxazoline with broad triplet δ3.77 and δ4.28 and 19% methyl ester with a broad singlet at δ3.63. This mixture was stored as a 10% solution in deionized water.

Example 18—Preparation of Poly(2-isopropenyl-2-oxazoline/methyl methacrylate) Copolymer from Poly(2-hydroxyethylmethacrylamide) Derived from PMMA MW≅35,000: Purification of Poly IPO/MMA by Ultrafiltration To a 1 liter, 3 neck round bottom flask fitted with a gas inlet adapter and a mechanical stirrer was added poly(2-hydroxyethylmethacrylamide) (52 g, 403 mmol methyl ester, derived from poly(methyl methacrylate) MW≅35,000) and 300 mL of dimethylformamide. This mixture was heated to ~150° C., stirred to obtain a clear, homogenous mixture and cooled to 25° C. To this stirred mixture was added methanesulfonyl chloride (58 g, 506 mmol, 1.25 equivalents per OH). Within about 10 minutes a white precipitate formed. This resulting mixture was heated to about 100° C. until a clear, homogenous mixture was obtained. This mixture was stirred by itself for 2 hours. This resulting mixture was poured into a dropping funnel attached to a 2 L three neck round bottom flask fitted with a gas inlet adapted attached to a $N_2$ bubbler and a mechanical stirrer. The mesylate-DMF mixture was added dropwise to a stirred mixture of 300 mL of DMF and sodium methoxide (110 g, 2.02 mol, 4 equivalents per mesyl chloride). The resulting mixture was stirred for 2 hours at room temperature. The volatiles of this mixture were distilled using a take-off distillation head at 1–5 mm Hg and 80°–150° C. The resulting residue was mixed with 3 L of MeOH and stirred to give a light brown homogenous mixture. This mixture was desalted (diafiltered) using an Amican B6 Housing containing 4.2 sq. ft. of regenerated cellulose membrane with a 3000 molecular weight cutoff. The pump was set at 20 L per minute and the back pressure valve was set at 30 psi. Methanol was added to the process fluid (retentate) to maintain a permeate (filtrate) flow of 50–75 mL per minute. The retentate was steadily reduced in volume from 3 L to about 500 mL as the salt was removed in the permeate. This resulting process fluid was then ultrafiltered at constant volume (500 mL) with MeOH until 8 retentate volumes (8×500 mL) of permeate had been obtained. The retentate volume was removed and the ultrafiltration device washed 3 times with 500 mL of MeOH. The combined retentate and washes were filtered with Whatman No. 1 filter paper. The filtrate was evaporated of volatiles and the resulting residue evacuated at a high vacuum at 25° C. for 18 hours to give 41 g (91%) of a slightly brown solid. Analysis of this product by $^1$H NMR spectroscopy (CD$_3$OD, Me$_4$Si) indicated 80% oxazoline with broad triplets at δ3.77 and δ4.28 and 19% methyl ester with a broad singlet at δ3.63. This mixture was stored as a 10% weight solution in deionized water at ~5° C.

Step 2 Example: Using Thionyl Chloride

Example 19—Preparation of Poly(2-isopropenyl-2-oxazolinium hydrochloride) from Poly(2-Hydroxyethylmethacrylamide) Using Thionyl Chloride To a 100 mL one neck round bottom flask containing a stir bar was added poly(2-hydroxyethylmethacrylamide) (3.0 g, 23 mmol OH maximum, 85% hydroxyl by IR) followed by thionyl chloride (25 mL, 40.7 g, 343 mmol, 14.9 equivalents per OH). This mixture was fitted with a reflux condenser with an exit port to a mineral oil bubbler which exited into a Pasteur pipe immersed in NaHCO$_3$ solution. The mixture remained heterogeneous at 25° C. with very little gas evolution. This mixture was placed in a bath at 85°–90° C. to reflux the thionyl chloride B.P.: 79° C.). Within 4 minutes of placing the vessel in the bath, a copious gas evolution occurred, over the next 20 minutes at this temperature. Gas evolution is essentially complete within 30 minutes after heating the mixture at 85°–90° C. The volatiles of this resulting mixture were removed by distillation using a short path distillation head, an aspirator vacuum and heating at 90°–120° C. The viscous polymer mixture remaining in the pot was removed and mixed with anhydrous ether (80 mL) and allowed to set for ~5 minutes under nitrogen. This operation changed the viscous solid to a firm solid that was scraped from the sides of the vessel and crushed to freer powder. This mixture was rapidly stirred for a few minutes. This procedure was repeated. The resulting solid was filtered in a Büchner funnel under nitrogen with Whatman No. 4 filter paper, washed with 3 aliquots of ether (~10 mL each) and dried under $N_2$ for only a few minutes. The solid was transferred to a dry 100 mL round bottom flask and evacuated at high vacuum and heating (30°–50° C.) for 30 minutes to give 3.6 g (theory; 3.45 g for full substituted polymer). A few crystals partially dissolved in 20 drops of CH$_2$Cl$_2$ and were made completely soluble by 1–2 drops of DMF. This solution was spread on a KBr disk and the disk was evacuated at a high vacuum for 1 hour. An infrared spectrum of this material indicated a relatively narrow but strong peak at 1668 cm$^{-1}$ for the oxazolinium cation and the absence of signals at 3400–3000 for OH stretch.

Half of the oxazoline polymer salt was added in aliquots to NaOH in H$_2$O, MeOH, H$_2$O and NaHCO$_3$ in H$_2$O. Upon addition of the polymer salt to any of these solutions gave an insoluble reddish-brown solid.

Step 3 Examples

Example 20—Preparation of Poly(2-isopropenyl-2-oxazoline) from Poly(2-isopropenyl-2-oxazolinium hydrochloride) using NaOMe The second half of the salt (1.5 g, 10.1 mmol) described in Example 19 was dissolved in 20 mL of DMF under N$_2$ to make a reddish-brown homogenous mixture. To this mixture was added NaOMe (3.0 g, 55 mmol, 5 equivalents per hydrochloride) in small portions. This resulting mixture was stirred at 25° C. for 2 hours and heated at 60° C. for 30 minutes. This mixture was distilled of volatiles using a short path distillation head at 120°–130° C. with 1–3 mm Hg vacuum. The solid residue remaining was stirred with 80 mL of toluene at 80°–90° C. overnight under N$_2$. This mixture was cooled to 25° C., filtered with Whatman No. 4 filter paper, and the resulting toluene solution evaporated of volatiles on the rotary evaporator at 27 inches Hg at 45°–50° C. The brownish-white solid was dissolved in a minimum of MeOH. This mixture was added dropwise to rapidly stirred, diethyl ether (200 mL) to give a white precipitate. A $^1$H NMR spectrum of this mixture indicated a broad signal at δ3.6 ppm for the methyl ester (47%) and two signals for the oxazoline at δ3.79 ppm and a δ4.25 ppm (53%).

Step 2 and 3 Examples: Using Thionyl Chloride

Example 21—Preparation of Poly(2-isopropenyl-2-oxazoline) by Cyclization of Poly(2-hydroxyethylmethacrylamide) With Thionyl Chloride and Neutralization To a 100 mL round bottom flask containing a stir bar was added poly(2-hydroxyethylmethacrylamide) (MW≅15,000) (3.0 g, 23 mmol ester maximum) followed by thionyl chloride (30 mL, 48.9 g, 411 mmol, 18 equivalents per OH). This mixture was stirred in a bath at 85°–90° C. The flask was attached to a reflux condenser with an exit port to a mineral oil bubbler which has an exit port into aqueous NaHCO$_3$ solution. This mixture began a violent gas eruption after about 3–4 minutes in the bath at 85° C. The gas evolution continued for 1–2 minutes and subsided to a gentle gas evolution. This mixture was heated for 1.5 hours. This clear brown mixture was cooled to room temperature and distilled of volatiles in a bath at 100° C. using an aspirator and a short path distillation head. The resulting thick residue was mixed with 80 mL of diethyl ether and allowed to stand for ~10 minutes under N$_2$. The viscous mixture changed to a granular salt-like material which could be scraped loose from the walls of the flask and crushed to a free powder. This mixture was stirred a few minutes and poured into a Büchner funnel containing Whatman No. 4 filter paper. The solid salt was washed twice with 50 mL of ether and dried under N$_2$ for 15 minutes. The salt was further dried in a tarred 100 mL flask with a stir bag using high vacuum for 15 minutes to give 3.5 g of an amber solid (theory: 3.4 g). This salt was dissolved in 30 mL of DMF by heating (~50° C.) and stirring to give a clear homogenous reddish-brown mixture. To this mixture at room temperature was added in small portions sodium methoxide (1.5 g, 27.8 mmol, 1.2–1.4 equivalents per hydrochloride salt). This mixture was rapidly stirred for 2 hours at ~25° C. under N$_2$. This mixture warmed by itself the first 30–45 minutes. The mixture changed color from the reddish-brown to a light tan during the two hours. The mixture was heated at 60° C. for 30 minutes. The volatiles were removed from the mixture by distillation at 1–2 mm Hg and a bath at 100° C. until distillation stops. The tan residue was dissolved in 100 mL, of MeOH and added dropwise with 2 dropping funnels into rapidly stirred toluene (200 mL). This mixture was filtered in a large Büchner funnel with Whatman No. 4 filter papers. The clear light reddish-brown mixture was evaporated of volatiles in a rotary evaporator at 26 inches of Hg at 40°–50° C. This viscous residue was dissolved in a minimum of MeOH and added dropwise to 100 mL of diethyl ether. The white precipitate was filtered in a Büchner funnel using Whatman No. 4 filter paper. The filter cake was washed with 2×50 mL of ether, dried under N$_2$ for ~5 minutes then evacuated at high vacuum at 25° C. overnight to give 2.6 g (96% yield) of the desired product. An infrared spectrum of this material (anhydrous MeOH solution on KBr plate, evaporated high vacuum) indicated the presence of an oxazoline moiety with bands at 1656 cm$^{-1}$ and 953 cm$^{-1}$. A $^1$H NMR spectrum of this material (CD$_3$OD, Me$_4$Si) indicated oxazoline peaks at δ3.72 ppm and δ4.28 ppm and a methyl ester peak at δ3.62 ppm. Integration of these $^1$H NMR spectrum signals indicated 55% oxazoline and 45% methyl ester.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

The embodiments of the invention in which an exclusive property or privilege is claimed are defined as follows:

1. A method of forming an oxazoline-containing polymer or copolymer by converting a poly(methacrylic ester) at least in part to a first polymer or copolymer comprising the corresponding poly(β—Y—N—(CH$_2$)$_x$ methacrylamide), and activating the β—Y—(CH$_2$)$_x$ amide group to form an oxazoline or oxazine ring, where Y is a leaving group and x=2 or 3.

2. The method of claim 1 wherein said activating step comprises converting said first polymer or copolymer to the corresponding poly(2-isopropenyl-2-oxazolinium or oxazinium cation), said activating step further comprising neutralizing/deprotonating said oxazolinium or oxazinium cation to form the oxazoline or oxazine-containing polymer or copolymer.

3. The method of claim 2 wherein said poly(methacrylic ester) is poly(methyl methacrylate).

4. The method of claim 2 wherein said poly(methacrylic ester) is a C$_1$ to C$_4$ ester.

5. The method of claim 3 wherein said poly(methyl methacrylate) is converted to said first polymer or copolymer by using ethanolamine or propanolamine, said first polymer or copolymer is converted to said corresponding poly(2-isopropenyl-2-oxazolinium or oxazinium cation) by reacting with a suitable esterifying/cyclizing agent.

6. The method of claim 5 wherein 5–50 equivalents of ethanolamine or propanolamine are reacted per poly(methyl methacrylate) ester group.

7. The method of claim 5 wherein 5–40 equivalents of ethanolamine or propanolamine are reacted per poly(methyl methacrylate) ester group.

8. The method of claim 5 wherein 5–15 equivalents of ethanolamine or propanolamine are reacted per poly(methyl methacrylate) ester group.

9. The method of claim 5 wherein said ethanolamine or propanolamine conversion is carried to at least about 80% such that the resulting oxazoline-containing copolymer has an oxazoline substitution of at least 80%.

10. The method of claim 5 wherein said ethanolamine or propanolamine conversion is carried to at least about 60% such that the resulting oxazoline-containing copolymer has an oxazoline substitution of at least 60%.

11. The method of claim 5 wherein said ethanolamine or propanolamine conversion is carried to about 50% such that the resulting oxazoline-containing copolymer has an oxazoline substitution of at least 50%.

12. The method of claim 5 wherein said poly(methyl methacrylate) is converted to said first polymer or copolymer in a nonreactive aprotic solvent at reflux.

13. The method of claim 5 wherein said poly(methyl methacrylate) is converted to said first polymer or copolymer neat at reflux.

14. The method of claim 13 in which said esterifying/cyclizing agent used is mesyl chloride.

15. The method of claim 14 in which said mesyl chloride is used in a solvent at an equivalents ratio of from about 1 to about 1.5 equivalents mesyl chloride per leaving group, assuming 100% conversion of said poly(methacrylic ester).

16. The method of claim 15 in which said reaction with mesyl chloride is conducted below about 100° C.

17. The method of claim 14 in which said mesyl chloride is contained in a solvent, and said esterifying/cyclizing reaction is conducted below about 100° C.

18. The method of claim 13 in which said esterifying/cyclizing agent is thionyl chloride.

19. The method of claim 18 in which said esterifying/cyclizing reaction is conducted with said thionyl chloride neat, at reflux.

20. The method of claim 5 in which said esterifying/cyclizing agent used is mesyl chloride.

21. The method of claim 20 in which said mesyl chloride is used in a solvent at an equivalents ratio of from about 1 to about 1.5 equivalents mesyl chloride per leaving group, assuming 100% conversion of said poly(methacrylic ester).

22. The method of claim 21 in which said reaction with mesyl chloride is conducted below about 100° C.

23. The method of claim 20 in which said mesyl chloride is contained in a solvent, and said esterifying/cyclizing reaction is conducted below about 100° C.

24. The method of claim 5 in which said esterifying/cyclizing agent is thionyl chloride.

25. The method of claim 24 in which said esterifying/cyclizing reaction is conducted with said thionyl chloride neat, at reflux.

26. The method of claim 2 in which said first polymer or copolymer is converted to said corresponding poly(2-isopropenyl-2-oxazolinium or oxazinium cation) by reacting with a suitable esterifying/cyclizing agent.

27. The method of claim 26 in which said esterifying/cyclizing agent used is mesyl chloride.

28. The method of claim 27 in which said mesyl chloride is used in a solvent at an equivalents ratio of from about 1 to about 1.5 equivalents mesyl chloride per leaving group, assuming 100% conversion of said poly(methacrylic ester).

29. The method of claim 28 in which said reaction with mesyl chloride is conducted below about 100° C.

30. The method of claim 27 in which said mesyl chloride is contained in a solvent, and said esterifying/cyclizing reaction is conducted below about 100° C.

31. The method of claim 26 in which said esterifying/cyclizing agent is thionyl chloride.

32. The method of claim 31 in which said esterifying/cyclizing reaction is conducted with said thionyl chloride neat, at reflux.

33. The method of claim 1 in which said activating step comprises the thermally induced cyclization-dehydration of said first polymer or copolymer.

34. The method of claim 33 in which a cyclization catalyst is used.

35. The method of claim 34 in which said catalyst is $ZnCl_2$, $ZnSO_4$, $Na_2B_4O_7$, $\gamma$-alumina or $Al_2O_3$.

36. The method of claim 34 in which said cyclization-dehydration is conducted at 80°–200° C.

37. The method of claim 34 wherein said poly(methacrylic ester) is a $C_1$ to $C_4$ ester.

38. The method of claim 37 wherein said poly(methyl methacrylate) is converted to said first polymer or copolymer by using ethanolamine or propanolamine, said first polymer or copolymer is converted to said corresponding poly(2-isopropenyl-2-oxazolinium or oxazinium cation) by reacting with a suitable esterifying/cyclizing agent.

39. The method of claim 1 in which said conversion is less than 100%, thereby resulting in said first polymer being a copolymer having some unconverted methacrylic ester groups; said method further comprising substituting one or more modifiers for at least some of said ester groups.

40. The method of claim 39 in which said modifier is a fluoride containing group.

41. The method of claim 39 in which said modifier is a UV stabilizer.

42. The method of claim 39 in which said modifier is an adhesion enhancer.

43. The method of claim 39 in which said modifier is a cure rate enhancer.

* * * * *

UNITED STATES PATENT AND TRADEMARK OFFICE
CERTIFICATE OF CORRECTION

PATENT NO. : 5,705,573
DATED : January 6, 1998
INVENTOR(S) : Douglas R. Swanson, et al It is certified that error appears in the above-identified patent and that said Letters Patent is hereby corrected as shown below:

Column 1, Line 24;

"oxazolininm" should be -- oxazolinium --

Column 1, Line 31;

"addition" should be --additional--.

Column 2, Step 3, Lines 55-63;

See Diagram; delete the enclosed "H".

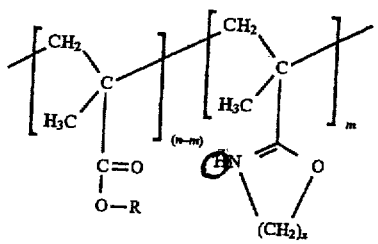

Column 5, Line 1;

Insert --Step 2: Using Mesyl Chloride--.

UNITED STATES PATENT AND TRADEMARK OFFICE
CERTIFICATE OF CORRECTION

PATENT NO. : 5,705,573
DATED : January 6, 1998
INVENTOR(S) : Douglas R. Swanson, et al It is certified that error appears in the above-identified patent and that said Letters Patent is hereby corrected as shown below:

Column 5, Line 38;

Insert -- Step 2: Using Thionyl Chloride--.

Column 7, Line 3;

"1637 cm$^{31}$ $^1$" should be --1637 cm$^{-1}$--.

Column 7, Line 41;

"later" should be --filter--.

Column 7, Line 48;

"later" should be --filter--.

Column 8, Line 15;

See Diagram; delete the enclosed "H".

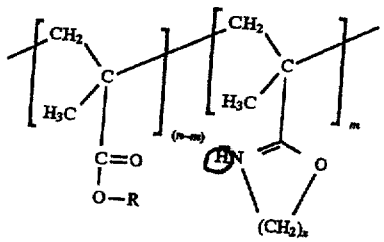

UNITED STATES PATENT AND TRADEMARK OFFICE
CERTIFICATE OF CORRECTION

PATENT NO. : 5,705,573
DATED : January 6, 1998
INVENTOR(S) : Douglas R. Swanson, et al It is certified that error appears in the above-identified patent and that said Letters Patent is hereby corrected as shown below:

Column 8, Line 64;

"Batman" should be --Whatman--.

Column 9, Line 68;

1H NMR" should be --$^1$H NMR--.

Column 11, Line 40;

"Au" should be --An--.

Column 11, Line 57;

"desked" should be --desired--.

Column 14, Line 3;

"wa" should be --was--.

Column 15, Line 42;

"20 g., 155 mmol of OH maximum)" should be

--(20 g., 155 mmol of OH maximum)

UNITED STATES PATENT AND TRADEMARK OFFICE
CERTIFICATE OF CORRECTION

PATENT NO. : 5,705,573

DATED : January 6, 1998

INVENTOR(S) : Douglas R. Swanson, et al

It is certified that error appears in the above-identified patent and that said Letters Patent is hereby corrected as shown below:

Column 16, Line 40;

"cm-1" should be --$cm^{-1}$--.

Column 17, Line 3;

"MW = 75,000)" should be --(MW = 75,000)--.

Column 17, Line 4;

"attire" should be mixture--.

Column 18, Line 57;

"freer" should be --finer--.

UNITED STATES PATENT AND TRADEMARK OFFICE
CERTIFICATE OF CORRECTION

PATENT NO. : 5,705,573
DATED : January 6, 1998
INVENTOR(S) : Douglas R. Swanson, et al It is certified that error appears in the above-identified patent and that said Letters Patent is hereby corrected as shown below:

Column 19, Line 60;

"free" should be --finer--.

Column 22, Claim 38, Line 33;

"poly(methyl methacrylate)" should be

--poly(methy methacrylate)--.

Signed and Sealed this

Twenty-eighth Day of April, 1998

Attest:

BRUCE LEHMAN

Attesting Officer

Commissioner of Patents and Trademarks